United States Patent
Riscutia et al.

(10) Patent No.: US 10,725,797 B2
(45) Date of Patent: Jul. 28, 2020

(54) SERVICE-DRIVEN DYNAMIC USER INTERFACE TECHNOLOGY

(71) Applicant: Microsoft Technology Licensing, LLC, Redmond, WA (US)

(72) Inventors: Vlad Riscutia, Redmond, WA (US); Darron J. Stepanich, Seattle, WA (US); Scott David Hoogerwerf, Seattle, WA (US); Michael Anthony Navarro, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 15/694,395

(22) Filed: Sep. 1, 2017

(65) Prior Publication Data
US 2018/0067754 A1     Mar. 8, 2018

Related U.S. Application Data

(60) Provisional application No. 62/383,543, filed on Sep. 5, 2016.

(51) Int. Cl.
*G06F 3/0481* (2013.01)
*G06F 9/451* (2018.01)
*H04L 12/58* (2006.01)
*G06F 8/60* (2018.01)

(52) U.S. Cl.
CPC ............ *G06F 9/451* (2018.02); *G06F 3/0481* (2013.01); *G06F 8/60* (2013.01); *H04L 51/046* (2013.01)

(58) Field of Classification Search
CPC combination set(s) only.
See application file for complete search history.

(56) References Cited

U.S. PATENT DOCUMENTS

| | | | |
|---|---|---|---|
| 5,892,939 A * | 4/1999 | Call | G05B 19/0426 365/112 |
| 7,219,305 B2 | 5/2007 | Jennings | |
| 7,315,826 B1 * | 1/2008 | Guheen | G06Q 10/06 705/7.29 |

(Continued)

FOREIGN PATENT DOCUMENTS

CN     104093077 B   *   5/2016

OTHER PUBLICATIONS

"A/B Testing", Published on: Sep. 11, 2015 Available at: https://www.optimizely.com/ab-testing/.

(Continued)

*Primary Examiner* — Steven P Sax

(57) ABSTRACT

Implementations disclosed herein provide a targeted messaging service that interfaces with a targeted messaging client on a device. The targeted messaging service provides a user-specific package to the client that specifies which native controls to invoke in response to which triggering events, as well as the assets to deploy in the controls. The targeted messaging client, which runs in the context of the native application it is supporting, receives the package from the service and monitors for the events that trigger targeted messages. A targeted control is formed by an existing native control combined with a specific asset provided in the package. When a given event occurs, the targeted messaging client merges the asset with the native control and displays the resulting targeted control in a user interface to the application.

15 Claims, 8 Drawing Sheets

(56) References Cited

U.S. PATENT DOCUMENTS

| | | | |
|---|---|---|---|
| 7,340,747 B1* | 3/2008 | Zeliger | G06F 9/465 709/203 |
| 7,506,259 B1 | 3/2009 | Narayanaswami et al. | |
| 9,280,677 B1* | 3/2016 | Perry | G06F 21/6218 |
| 9,292,364 B1* | 3/2016 | Linge | G06F 9/542 |
| 9,349,123 B1* | 5/2016 | McNamara | H04L 67/10 |
| 9,413,708 B1* | 8/2016 | Michael | H04L 51/24 |
| 10,091,287 B2* | 10/2018 | Larabie-Belanger | G06F 16/176 |
| 2002/0113812 A1 | 8/2002 | Walker et al. | |
| 2003/0025732 A1 | 2/2003 | Prichard | |
| 2004/0183832 A1 | 9/2004 | Baccou | |
| 2004/0216036 A1 | 10/2004 | Chu et al. | |
| 2007/0192872 A1* | 8/2007 | Rhoads | G06F 3/017 726/26 |
| 2009/0100359 A1 | 4/2009 | Sauve et al. | |
| 2010/0045816 A1* | 2/2010 | Rhoads | G06K 9/228 348/222.1 |
| 2010/0058172 A1 | 3/2010 | Soldan et al. | |
| 2012/0096438 A1* | 4/2012 | Rossi | G06F 11/3684 717/125 |
| 2012/0137235 A1 | 5/2012 | T S et al. | |
| 2013/0152056 A1* | 6/2013 | Chang | G06F 11/0742 717/131 |
| 2013/0159784 A1* | 6/2013 | Rossi | G06F 11/3684 714/47.1 |
| 2013/0159890 A1* | 6/2013 | Rossi | G06F 11/3608 715/762 |
| 2013/0212487 A1 | 8/2013 | Cote | |
| 2014/0155043 A1* | 6/2014 | Gell | H04W 4/60 455/414.1 |
| 2014/0173692 A1* | 6/2014 | Srinivasan | H04W 12/02 726/4 |
| 2014/0194112 A1* | 7/2014 | Ngo | H04W 4/14 455/419 |
| 2014/0207851 A1* | 7/2014 | Qu | G06F 9/541 709/203 |
| 2014/0222610 A1* | 8/2014 | Mikurak | G06Q 10/087 705/26.5 |
| 2014/0325374 A1 | 10/2014 | Dabrowski et al. | |
| 2014/0359558 A1* | 12/2014 | Chamberlain | G06F 8/34 717/105 |
| 2015/0052503 A1* | 2/2015 | Ligman | G06F 11/3664 717/125 |
| 2015/0193904 A1* | 7/2015 | Vermeulen | G06T 1/20 345/522 |
| 2015/0220942 A1* | 8/2015 | Dubberley | G06Q 30/0201 705/7.29 |
| 2015/0294349 A1* | 10/2015 | Capel | G06Q 30/0244 705/14.43 |
| 2016/0148264 A1* | 5/2016 | Winstanley | G06F 16/248 705/14.55 |
| 2016/0150387 A1* | 5/2016 | Myers | H04W 4/14 455/466 |
| 2017/0060823 A1* | 3/2017 | Zheng | G06F 16/248 |
| 2017/0293454 A1* | 10/2017 | Beery | G06F 3/1206 |

OTHER PUBLICATIONS

"Xamarin.Forms", Published on: Mar. 27, 2015 Available at: https://xamarin.com/forms.

Thake, Jeremy, "Introducing Office UI Fabric—your key to designing add-ins for Office", Published on: Aug. 31, 2015 Available at: https://blogs.office.com/2015/08/31/introducing-office-ui-fabric-your-key-to-designing-add-ins-for-office/.

"React Native", Retrieved on: Feb. 18, 2016 Available at: https://facebook.github.io/react-native/.

Lauridsen, Ole, "Abstract Specification of User Interfaces", in Proceedings of Conference Companion on Human Factors in Computing Systems, May 7, 1995, pp. 1-4.

Mitchell, Scott, "Creating Dynamic Data Entry User Interfaces", Published on: Dec. 2004 Available at: https://msdn.microsoft.com/en-us/library/aa479330.aspx.

* cited by examiner

SERVICE-DRIVEN DYNAMIC USER INTERFACE TECHNOLOGY

RELATED APPLICATIONS

This application is related to and claims priority to U.S. Provisional Patent Application No. 62/383,543, filed Sep. 5, 2016, and entitled "Service-Driven Dynamic User Interface Technology," which is hereby incorporated by reference in its entirety.

TECHNICAL BACKGROUND

A/B testing technology allows software developers to experiment with various user interface configurations, to discover which configuration is optimal. Multiple experimental configurations may be developed, for example, and then served to specific users, whose interaction and feedback may be monitored and evaluated. The same or similar technology may be employed to customize user interface configurations on a per-user basis. In both cases, various limitations of the technology result in sub-optimal user experiences.

One solution renders experimental or user-specific content in a web view. However, such web views typically do not look and behave the same a native interfaces and the renderers that support them may be slow or lack native integration. A different solution allows the native elements of a user interface to be re-arranged per an experiment or user customization. While properties of the native elements can be changed, their text and other aspects cannot, resulting in relatively rigid experiments and customization.

In a related context, developers may wish to converse with their users, in that they want to deliver contextually relevant messages for the users to consume. For example, a developer may want to alert a user to a new feature or function, converse with a user about his or her subscription status, or the like. The aforementioned infrastructure for running experiments can be leveraged to deliver such messages (as opposed to experimental configurations), but only with the same limitations discussed above.

Another solution is to provide links within a user interface to a native application that, when clicked-on by the user, deliver the user to a web experience outside of the native application. In either case, the user experience is sub-optimal and the developer's ability to converse meaningfully with end-users is limited.

Overview

Technology is disclosed herein that allows for experiments, customization, and in-app messaging to be deployed in the context of a native application using the native controls that are part of the application. In an implementation, a targeted messaging service in the cloud interfaces with a targeted messaging client on a device. The targeted messaging service provides a user-specific package to the client that specifies which native controls to invoke in response to which triggering events, as well as the assets to deploy in the controls.

The targeted messaging client, which runs in the context of the native application it is supporting, receives the package from the service and monitors for the events that trigger targeted messages. A targeted control is formed by an existing native control combined with a specific asset provided in the package. When a given event occurs, the targeted messaging client merges the asset with the native control and displays the resulting targeted control in a user interface to the application.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
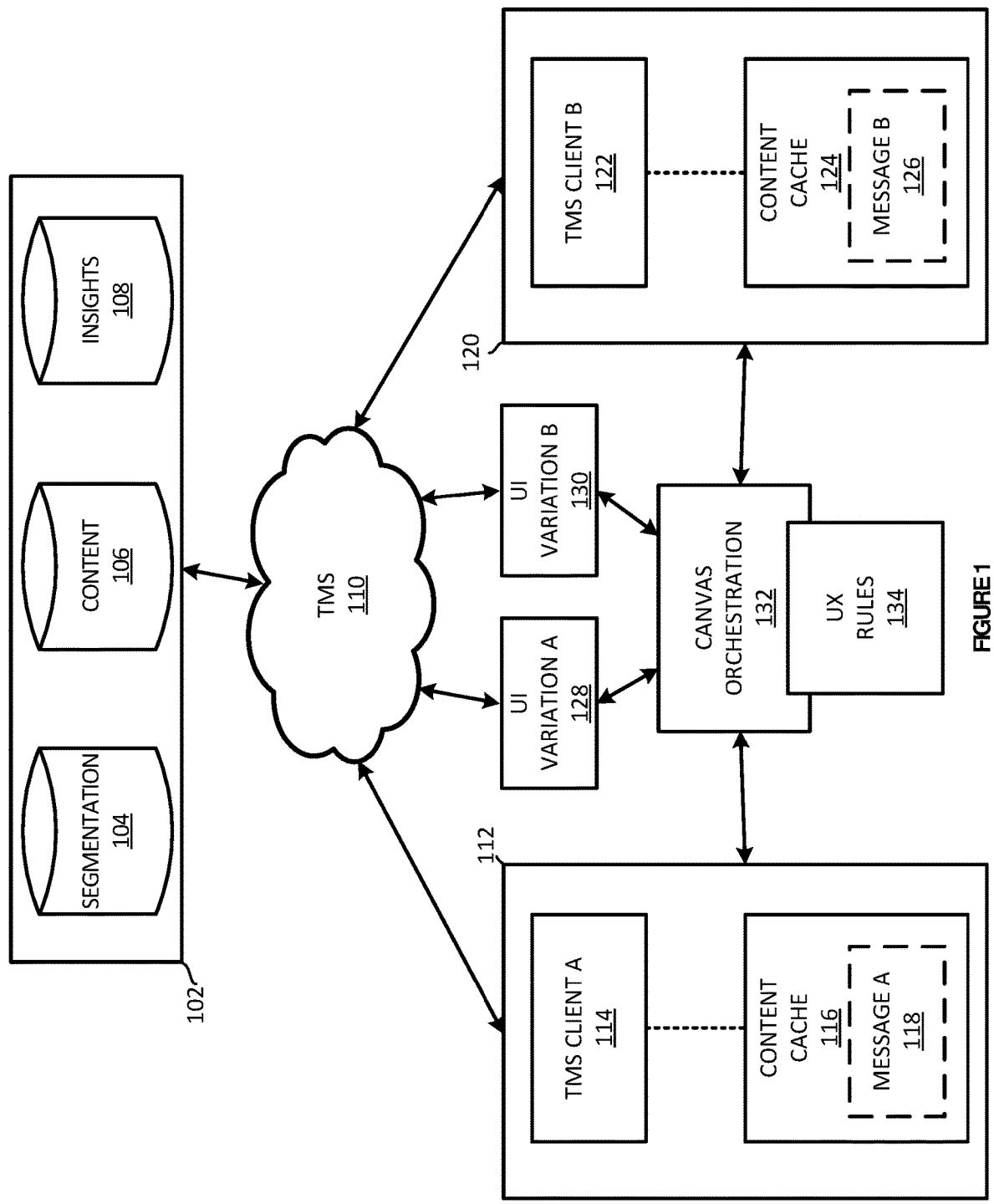
FIG. 1 illustrates a representative architecture of a distributed computing environment for implementing targeting messaging as described herein.

Implementations disclosed herein provide a targeted messaging service in the cloud interfaces with a targeted messaging client on a device. The targeted messaging service provides a user-specific package to the client that specifies which native controls to invoke in response to which triggering events, as well as the assets to deploy in the controls.

As described herein, a native control comprises any mechanism for communicating content through an application to an application user. For example, native controls may comprise pop-up windows that may be presented to a user via native application user interfaces, interactive buttons or other objects that may be displayed to a user via native application user interfaces, as well as mechanisms that are native to a particular application for presenting associated content with those native controls. A triggering event, as used herein, comprises an event associated with a user of an application, which is used to trigger a target control to be presented to a user in a native application. An asset, as used herein, comprises the content that will be presented in association with a target control in a native application (e.g., text in a pop-up window, audio associated with the interactive click of a button or other native application object, video associated with a teaching user interface, etc.).

The targeted messaging client, which runs in the context of the native application it is supporting, receives the user-specific package from the targeted messaging service and monitors for the events that trigger targeted messages. A targeted control is formed by an existing native control combined with a specific asset provided in the package. When a given event occurs, the targeted messaging client merges the asset with the native control and displays the resulting targeted control in a user interface to the application.

Such a solution provides the technical effect of enabling enhanced A/B experimentation, better user customization, and improved message delivery to end-users. With respect to A/B testing, the targeted messaging disclosed herein allows experiments to be run using native controls, but without having to pre-load or pre-install the experimental variances in the controls. User-customization is enhanced by being able to deliver user-specific experiences through native controls. Similarly, developers are able to direct contextually relevant messages through native controls at run-time, without having to pre-load or pre-install the various messages that may be surfaced.

In an implementation, a targeted messaging system ("system") is disclosed that is comprised of a service which manages content and sends abstract user interface descriptions to clients which render the abstract user interface into platform-specific layouts and controls. This addresses the need to be able to quickly experiment and A/B test user interface experiences on clients without the need to update client code. This also greatly increases agility of deploying said experiments and also reduces code bloat in the clients.

In examples, application suites that are in network communication with the system, may be provided with the ability to display rich dynamic user interfaces, by providing an abstract user interface tree object model with platform-specific renderers which convert it into native user interface elements (e.g., user interface elements that are native to a particular application of an application suite, user interface elements that are native to a particular application of an application suite as presented by a type of client device, user interface elements that are native to a particular application of an application suite as presented by a type of operating system that is running the particular application), thereby leveraging the application suite user interface framework for each platform that is provided by an application suite. The system also enables application suite clients to A/B test user interface experiences, by serving different content to different clients. For example, different clients may include: different applications of an application suite, different client device types that are executing an application of an application suite (i.e., different user interface types based on an executing client device type), different subscribers to an application suite (a particular enterprise subscriber, a type of enterprise subscriber, an individual user, etc.).

In a specific example related to Microsoft® Office, the system will enable Office clients to display rich dynamic user interfaces, by providing an abstract user interface tree object model with platform-specific renderers which convert it into native user interface elements, leveraging the Office user interface framework for each given platform. The system will also enable Office clients to A/B test user interface experiences, by serving different content to different clients.

The targeted messaging system is comprised of the service and a client framework. The service may provide user interface variations, including associated triggering event variations, from a content store to different groups of clients based on segmentation (e.g., user groups that subscribe to one or more services associated with a native application, user groups residing in certain geographic regions, user groups having a type of software license to one or more native applications, etc.), thereby enabling group-specific A/B testing of targeted messages. Clients receive their respective user interface variations (e.g. client A sees variation 1, client B sees variation 2). Telemetry related to user interaction (or lack thereof) with targeted messages may be provided back to the system, from which insights can be produced around effectiveness of various user interfaces, click through rate, engagement, etc.

According to examples, a resilient hosted user experience may be provided in scenarios when the loading of web content in a user interface is stalled. In such a scenario, a user experience package may include a pre-determined fall back page that loads when the web content is stalled. The fall back page may be loaded from disk in a scenario where the client has no connectivity.

If connectivity exists, but the connection is slow, then the client can navigate to a fall back URL that loads a low-bandwidth "shell" page that can load while the main page is loaded in the background. The client can switch to the main page once it is loaded.

It may be appreciated from the foregoing discussion that contextual conversations may be supported by the targeted messaging technology disclosed herein. For example, if a user navigates to a "Save As" screen, the user may be presented with a short teaching user interface on a cloud-based storage service (e.g., OneDrive®, DropBox®, etc.) and its capabilities. Assuming the user saves his or her document to the cloud-based storage service, the user experience can change the next time the user navigates to the "Save As" screen. For example, the next time, rather than presenting the same teaching user interface, a user experience can be presented for the user to enter his or her phone number, so that the user can download the cloud-based storage service application to their mobile phone or other computing device from which the application is running. Thus, the user's experience with the "Save As" screen and teaching user interfaces will feel more like a conversation than a menu experience.

FIG. 1 illustrates one representative architecture of a distributed computing environment 100 for implementing targeted messaging as disclosed herein. Distributed computing environment 100 includes database sub-environment 102 (including segmentation database 104, content database 106, and insights/telemetry database 108), targeted messaging service 110, first targeted messaging client sub-environment 112 (including TMS client A 114, content cache 116, and message A 118 within content cache 116), second targeted messaging client sub-environment 120 (including TMS client B 122, content cache 124, and message B 126 within content cache 124), and canvas orchestration sub-environment 132. Distributed computing environment 100 also includes user interface variation A 128, user interface variation B 130, and user experience rules 134, which are associated with canvas orchestration sub-environment 132.

First targeted messaging client sub-environment 112 includes TMS client A 114 and content cache 116. TMS client A 114 may comprise a computing device associated with an application (e.g., a word processing application, a database entry application, a presentation application, etc.) that a first user accesses via that computing device. In some examples the first user may have a registered account (e.g., an account registration with a software company, a software license for the application, etc.) linking the user to the application. TMS client A 114 may include software for running the application, a graphical user interface for providing a user interface for the application, and one or more mechanisms for providing input to the computing device. TMS client A 114 is in communicative contact with content cache 116, which caches information associated with targeted messages, such as message A 118, as described herein.

Likewise, second targeted messaging client sub-environment 120 includes TMS client B 122 and content cache 124. TMS client B 122 may comprise a computing device associated with an application (e.g., a word processing application, a database entry application, a presentation application, etc.) that a second user accesses via that computing device. In some examples, the second user may also have a registered account linking the user to the application. TMS client B 122 may include software for running the application, a graphical user interface for providing a user interface for the application, and one or more mechanisms for providing input to the computing device. TMS client B 122 is in communicative contact with content cache 124, which caches information associated with targeted messages, such as message B 126, as described herein.

Although shown as being distinct from first targeted messaging client sub-environment 112, and second targeted messaging client sub-environment 120, one or more operations associated with canvas orchestration in canvas orchestration sub-environment 132 may take place on the same or different computing devices that perform the functions discussed above with regard to first targeted messaging client sub-environment 112 and second targeted messaging client sub-environment 120.

One or more computing devices associated with orchestration sub-environment 132 may perform operations including: registering canvases and triggers with targeted messaging service 110, including: determining a priority order for downloading and caching those canvases and triggers from targeted messaging service 110 to first and second targeted messaging client sub-environments 112 and 120; receiving trigger signals from first and second targeted messaging client sub-environments 112 and 120; and determining, based on those signals, which targeted control to surface on a display device associated with the TMS client from which a triggering signal was received. In examples, in determining which targeted control to surface, one or more computing devices associated with orchestration sub-environment 132 may analyze user experience rules 134 based on received signals from first or second targeted messaging client sub-environments 112 and 120, and determine based on one or more user experience rules as applied to the received signals, whether a targeted control should be surfaced. In some examples user experience rules 134 may be executable for monitoring for the occurrence of one or more prevention events that indicate that a targeted control should not be displayed upon detection of an event that triggers the targeted control. For example, one or more prevention events may be associated with not interrupting a user's application flow (e.g., do not surface a targeted control if an application has been launched by double clicking a file, do not surface a targeted control if an application has been launched by opening an attachment, do not surface a targeted control if a native dialog has already been surfaced upon boot, do not surface a targeted control if a native dialog has already been surfaced upon save, etc.).

In examples, targeted messaging service 110 may receive a query from TMS client A 114, or canvas orchestration 132 on behalf of TMS client A 114, regarding what targeted controls should be surfaced within an application running on TMS client A 114 when one or more triggering events occur. When such a query is received, one or more computing devices associated with targeted messaging service 110 may communicate with segmentation database 104, and determine which triggering events and associated targeted controls may be surfaced by that querying client (i.e., TMS client A 114), as opposed to other clients that may query the targeted messaging service 110 (e.g., TMS client B 122). In examples, when a determination is made as to what triggering events and associated targeted controls may be surfaced to TMS client A 114, that information may be provided to TMS client A 114 from content database 106, via targeted messaging service 110 and canvas orchestration 132. For example, a determination may be made that user interface variation A 128 may be surfaced within an application running on TMS client A 114 upon a specific triggering event occurring within that application, and user interface variation A 128 may be caused to be surfaced within the application when that event occurs.

In other examples, targeted messaging service 110 may receive a query from TMS client B 122, or canvas orchestration 132 on behalf of TMS client B 122, regarding what targeted controls should be surfaced within an application running on TMS client B 122 when one or more triggering events occur. When such a query is received, one or more computing devices associated with targeted messaging service 110 may communicate with segmentation database 104, and determine which triggering events and associated targeted controls may be surfaced by that querying client (i.e., TMS client B 122), as opposed to other clients that may query the targeted messaging service 110 (e.g., TMS client A 114). In examples, when a determination is made as to what triggering events and associated targeted controls may be surfaced to TMS client B 122, that information may be provided to TMS client B 122 from content database 106, via targeted messaging service 110 and canvas orchestration 132. For example, a determination may be made that user interface variation B 130 may be surfaced within an application running on TMS client B 122 upon a specific triggering event occurring within that application, and user interface variation B 130 may be caused to be surfaced within the application when that event occurs.

In examples, the information sent from targeted messaging service 110 to either of TMS client A 114 or TMS client B 122 may comprise a user-specific package specifying at least which native control to invoke in response to a triggering event, as well as an asset to deploy in the native control. A received user-specific package may be cached by a querying TMS client (e.g., TMS client A 114, TMS client B 122), such that when a triggering event occurs within an application running on the querying TMS client, a targeted control comprised a corresponding native control and asset may be surfaced from the cache (e.g., content cache 116, content cache 124).

According to some examples, when a targeted control is surfaced to a TMS client within an application, telemetry information associated with that surfacing such as the amount of time that the targeted control was displayed before being closed by a user, whether a message within the targeted control was scrolled through, whether a button surfaced with a targeted control was accessed, etc., may be communicated back to targeted messaging service 110 and stored within insights database 108.

Figure 2:
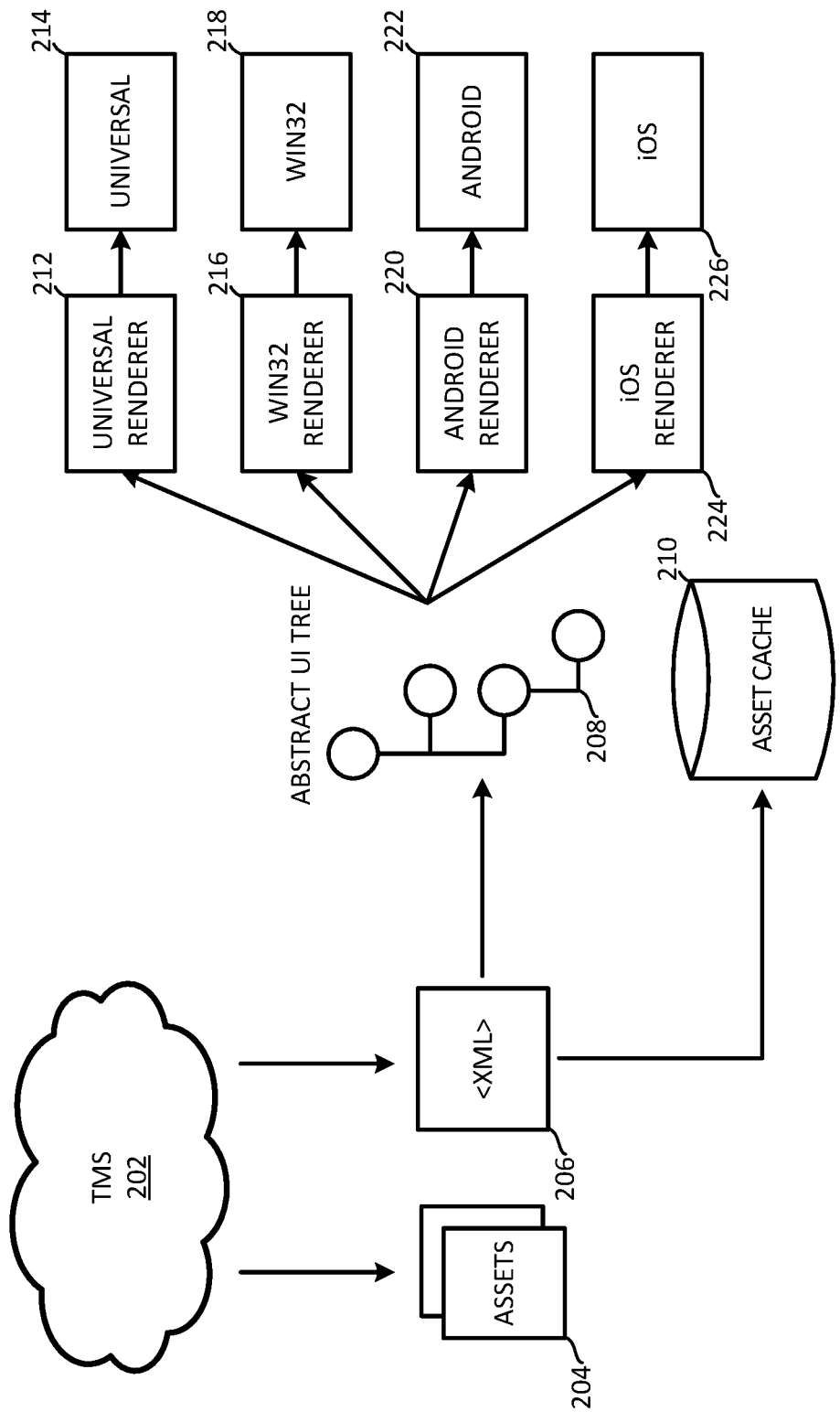
FIG. 2 illustrates another representative architecture for implementing targeted messaging as described herein.

FIG. 2 illustrates another representative architecture 200 for implementing targeted messaging as disclosed herein.

The systems, methods, and devices for providing targeted messaging disclosed herein allows for service-driven rich user interface descriptions to be sent down to clients from a targeted messaging service. In examples, client-side renderers may render the user interface descriptions.

Unlike an HTML stack, the system will render markup on top of an operating system user interface framework, so all elements will get converted to native controls. This provides automatic support for message theming, accessibility, etc.

The representative architecture 200 of FIG. 2 includes a targeted messaging service 202. A client connects to the targeted messaging service 202 to retrieve dynamic user experience content. In some examples, canvas controls may be implemented by representative architecture 200, including a dialog and a teaching user interface. The dialog may comprise a web dialog hosting the HTML/JS user experience, and the teaching user interface may comprise a native control which can also be used as a canvas.

In some implementations, a hybrid system may be employed where rich interactive user experience is rendered as HTML in a modal dialog, while other more inline messages may be rendered natively using available controls. Native controls may be utilized for more inline experiences, so they don't feel out of place when integrated with a particular application and operating system of an executing client.

A particular user experience package may be a signed archive containing a manifest and one or more files implementing the user experience and assets. The manifest provides the information required to drive the user experience (trigger, canvas-specific configuration, entry point etc.), while the implementation files contains the remaining data required for the user experience. These can be interpreted by each canvas, so, for example, for a teaching user interface, the user experience may be implemented with an XML file+image/video assets, while for a web dialog user experience, the user experience may be implemented with HTML/CSS/JS+image/video assets.

One particular use case of the targeted messaging system disclosed herein is to support HTML dialog as applied to a native teaching user interface in Win32 clients. Additional use cases include a OneDrive upsell campaign, triggered on "Save As", with a mix of native (teaching user interface) and HTML user experience; a subscription sharing campaign, triggered on boot, with an HTML user experience; and a renewal in client, triggered on boot, with a mix of a native messaging format and HTML user experience.

In examples, targeted messaging system 202 may receive a query to provide a set of client/user-specific triggering events and corresponding targeted controls which may be surfaced upon occurrence of a corresponding triggering event in an application. In response, the targeted messaging system 202 may determine a user-specific package comprised of one or more XML files and corresponding assets (e.g., XML file 206 and assets 204) that apply to the querying client. In examples, the XML files and corresponding assets may correspond to one or more abstract user interface trees, such as abstract user interface tree 208. That is, a user-specific package may comprise a set of targeted control user interfaces that may be surfaced to a client in a tree format depending on how a user interacts with a targeted control user interface when it is surfaced upon a triggering event occurring within an application. For example, depending on the operating system running on the querying client device, one or more renders may be employed to convert the XML files to a format that is specific to the operating system running on the querying client device. If a universal operating system is running on the querying client device, XML file 206 may be converted by universal renderer 212 such that the XML file 206 may be rendered in universal format 214. If a WIN32 operating system is running on the querying client device, XML file 206 may be converted by WIN32 renderer 212 such that the XML file 206 may be rendered in WIN32 format 218. If an Android operating system is running on the querying client device, XML file 206 may be converted by Android renderer 220 such that XML file 206 may be rendered in an Android format 222. If an iOS operating system is running on the querying client device, XML file 206 may be converted by iOS renderer 224 such that XML file 206 may be rendered in an iOS format 226. In some examples, targeted messaging system 202 may communicate with an asset cache, such as asset cache 210, in response to receiving a client query and obtain corresponding assets and/or XML files that are specific to the querying client.

Figure 3:
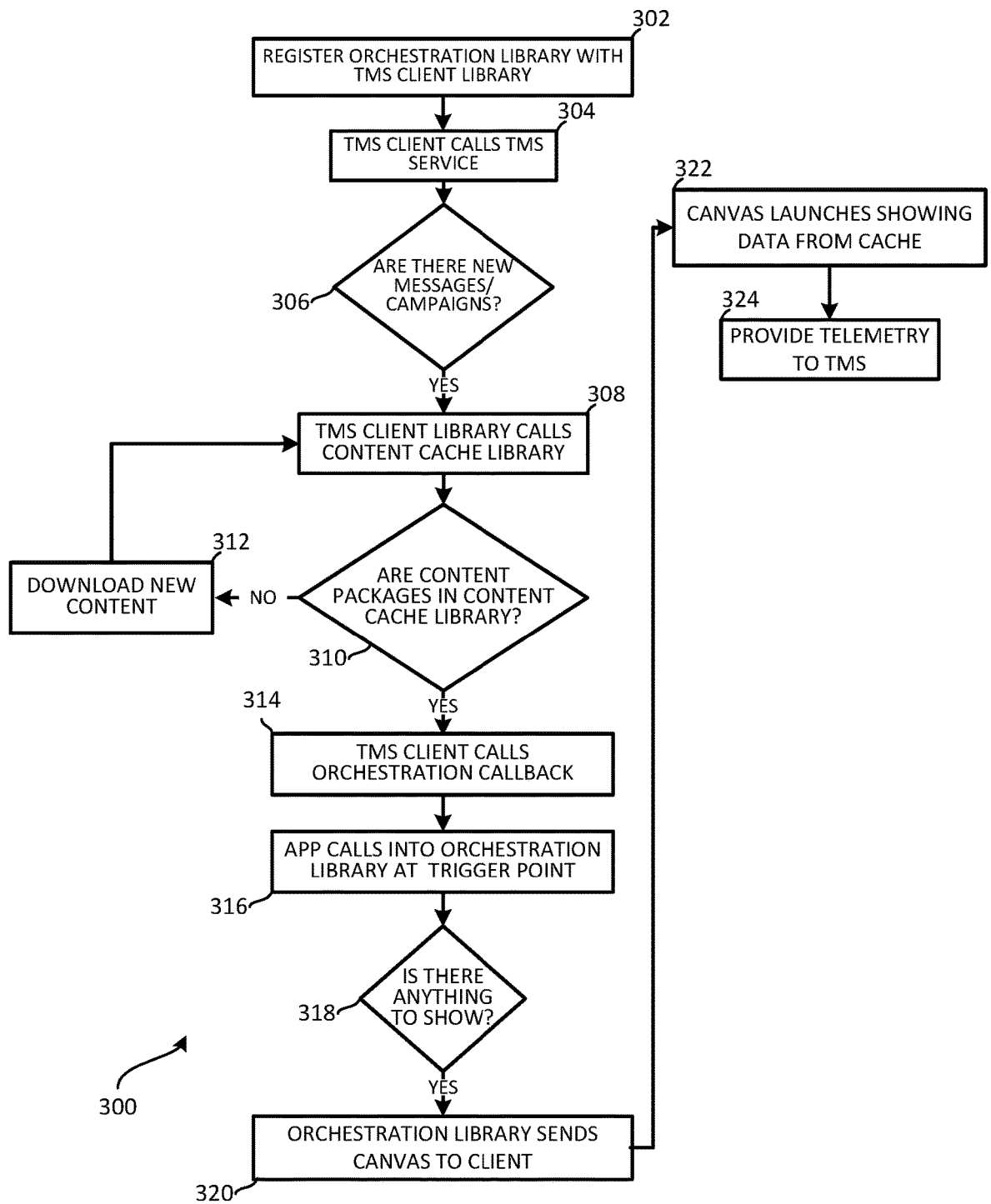
FIG. 3 illustrates an exemplary method for implementing targeted messaging across a distributed messaging architecture as described herein.

FIG. 3 illustrates an exemplary method 300 for implementing targeted messaging across a distributed messaging architecture according to aspects described herein.

The method 300 starts at operation 302 where, upon application boot, an orchestration library registers with a targeted messaging service library. For example, when an application boots on a client device, an orchestration engine may call the targeted messaging service at operation 304, and at operation 306, a targeted messaging service library may be queried by the targeted messaging service to determine whether any new messages/campaigns associated with the client that booted the application are available.

If a determination is made at operation 306 that there are new and available messages/campaigns associated with the client that booted the application, the targeted messaging service client library calls a content cache library at operation 308, and flow continues to operation 310 where a determination is made as to whether the new and available messages/campaigns are cached locally on the requesting client.

If at operation 310, a determination is made that the new and available messages/campaigns are not cached locally, flow continues to operation 312 where the new and available content is downloaded from the targeted messaging service and cached locally by the requesting client, and flow may continue back to operation 308.

If at operation 310, a determination is made that the new and available messages/campaigns are cached locally, flow continues to operation 314. At operation 314 the client calls the orchestration callback for a given trigger/surface, and at operation 316 the application running on the client calls into the orchestration library when a triggering event occurs (e.g., a triggering boot event, a triggering save event, etc.). From operation 316 flow continues to operation 318, where a determination is made as to whether there is a targeted control to surface within the application based on the occurrence of the triggering event. For example, if the no user experience rules prevent the surfacing of a corresponding targeted control when the triggering event occurs, flow continues to operation 320 where the orchestration library provides a canvas corresponding to the triggering event to the client, and at operation 322 the canvas is launched within the application with corresponding content that is cached for the triggering event.

From operation 322 flow continues to operation 324 where information related to the surfacing of canvas and messaging within the canvas (i.e., the surfacing of the targeted control) is provided back to the targeted messaging system. For example, information related to whether the targeted control was surfaced successfully or unsuccessfully may be provided to the targeted messaging service and/or stored in an insights database. Likewise, information related to user engagement, such as the amount of time that the targeted control was displayed within the application, whether a user accessed one or more nodes of the targeted control, whether a user closed the targeted control without accessing one or more nodes of the targeted control, whether a user accessed a service presented by the targeted control, etc., may be provided to the targeted messaging system and/or stored in an insights database.

Figure 4:
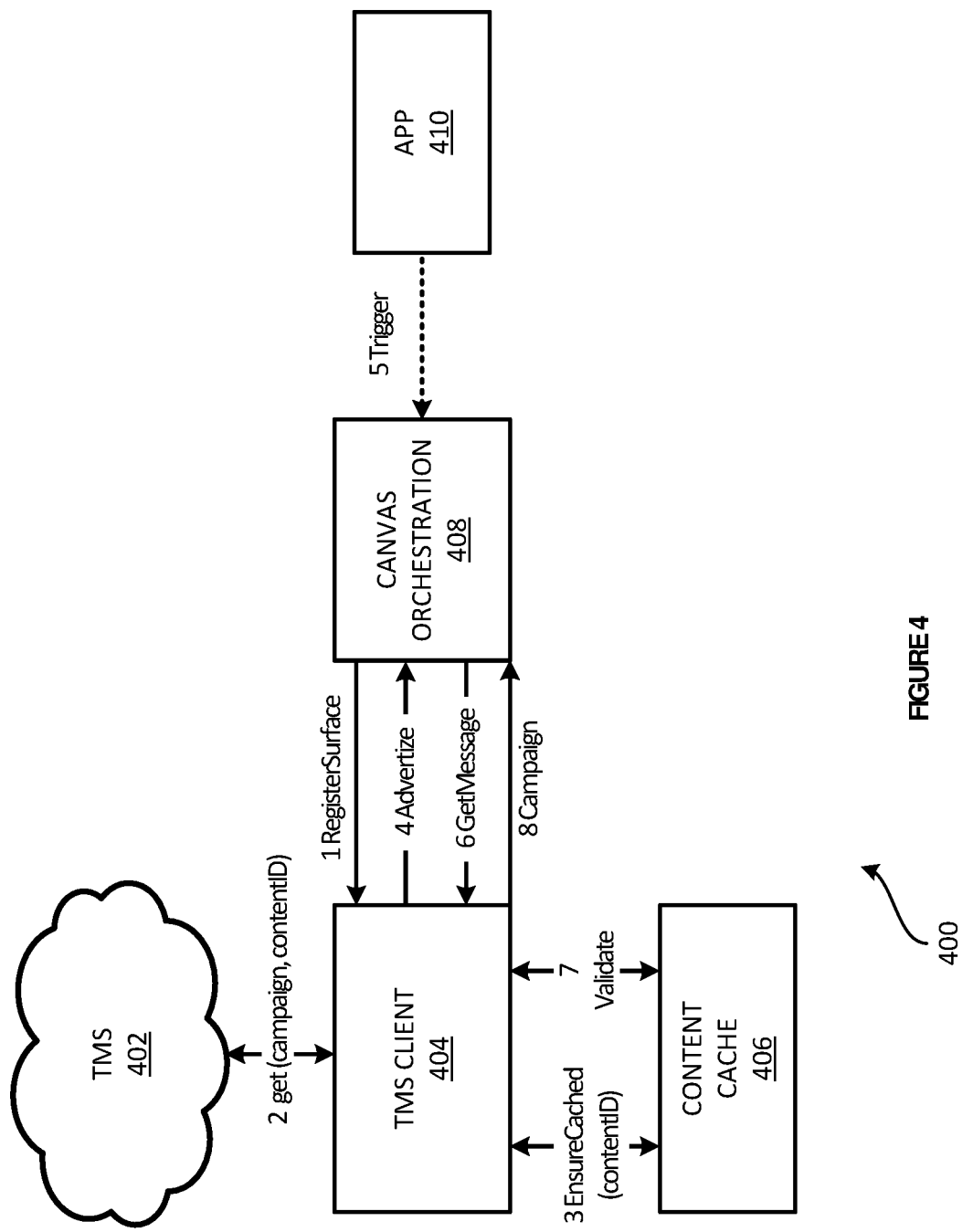
FIG. 4 illustrates a representative architecture and corresponding architecture flow for implementing targeted messaging as described herein.

FIG. 4 illustrates a representative architecture 400 and corresponding architecture flow for implementing targeted messaging as disclosed herein. Representative architecture 400 includes targeted messaging service component 402, TMS client component 404, content cache component 406, canvas orchestration component 408, and application component 410.

One or more of the following operations may be executed by the components of representative architecture 400. In first operation (1 Register Surface), canvas orchestration component 408 makes a RegisterSurface call to TMS client component 404 to request content corresponding to each surface. In second operation (2 get [campaign, content ID]), TMS client component 404 obtains a campaign and contentID (the content ID is a pointer to content on CDN) from targeted messaging service component 402. In third operation (3 EusureCached [content ID]), TMS client component makes a EnsureCached call on the content cache component 406 to ensure that the content corresponding to the content ID is downloaded and cached if it is not already cached by the content cache component 406. In fourth operation (4 Advertize), the TMS client component 404 returns an Advertize message to canvas orchestration component 408 to notify canvas orchestration component 408 that a campaign is available for a given surface. In fifth operation (5 Trigger), the application component 410 provides a notification to canvas orchestration component 408 that a triggering event has occurred in the client for which a user experience should be displayed (e.g., a boot event, a save event, etc.). In sixth operation (6 GetMessage), a GetMessage call is made, from orchestration component 408 to TMS component 404, to retrieve the campaign. In seventh operation (7 Validate), TMS client component 404 validates content cache component 406 to ensure that the cached content remains available and is not corrupted. In eighth operation (8 Campaign), the campaign is sent from TMS component 404 to canvas orchestration component 408, which orchestrates the display of the campaign on one or more canvases.

Figure 5:
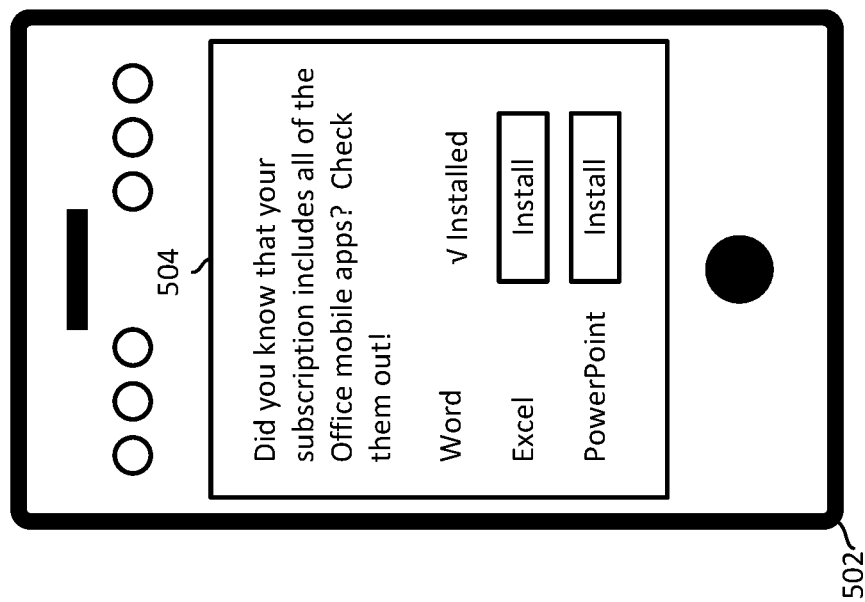
FIG. 5 is a representation of a teaching user interface supported by the targeted messaging technology disclosed herein.
Figure 6:
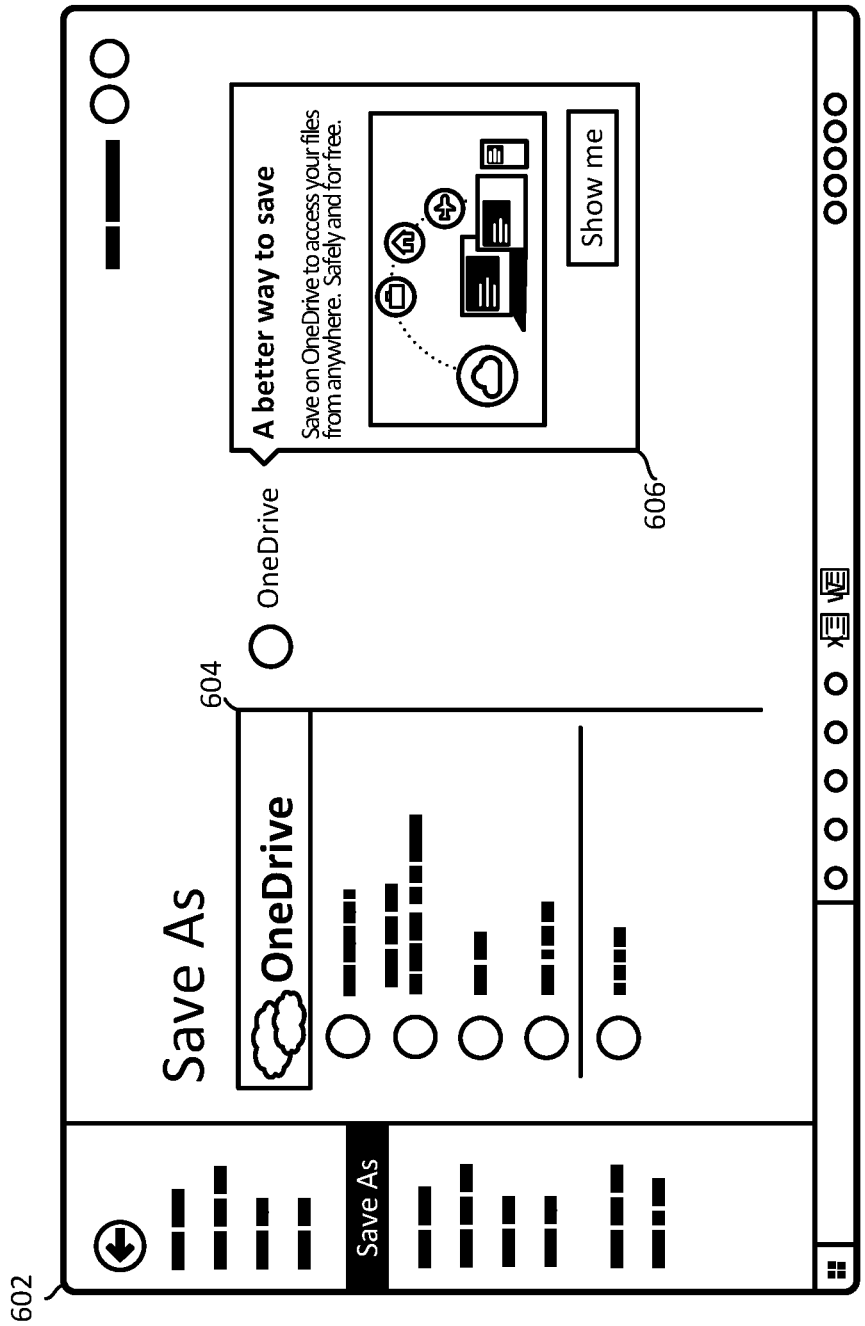
FIG. 6 is another representation of a teaching user interface supported by the targeted messaging technology disclosed herein.
Figure 7:
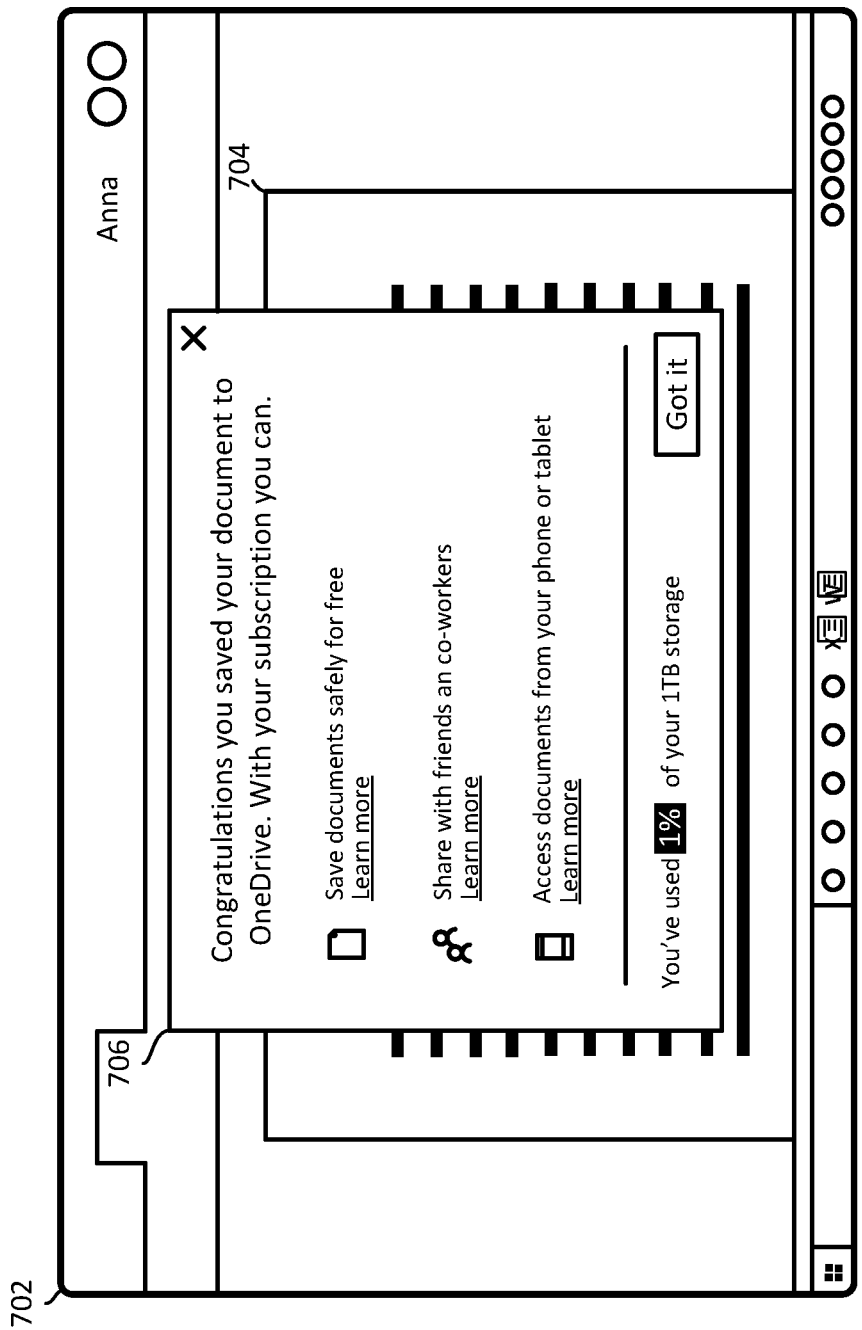
FIG. 7 is another representation of a teaching user interface supported by the targeted messaging technology disclosed herein.

FIG. 5, FIG. 6, and FIG. 7 each include representations of a teaching user interface supported by the targeted messaging technology disclosed herein.

FIG. 5 includes a client device 502 executing an application in which a teaching user interface 504 has been surfaced based on a triggering event occurring in the application. The teaching user interface 504 may be surfaced upon a triggering such as a booting of the application, a closing of the application, a save of a document executed in the application, etc.

FIG. 6 includes a client user interface 602 which displays an application run on a client device. The user interface shows teaching user interfaces 604 and 606. Teaching user interfaces 604 and 606 may be surfaced within client user interface 602 upon the execution of a triggering event such as a "SaveAs" operation being executed within the application. Teaching user interface 604 displays a targeted control comprised of a native control for the application and an asset comprised of messaging content describing OneDrive® cloud-based storage services that may be utilized for saving a document being saved in the application, and teaching user interface 606 displays a secondary targeted control comprised of a native control for the application and an asset comprised of messaging content and images describing and illustrating how OneDrive® cloud-based storage services may be utilized for saving a document being saved in the application.

FIG. 7 includes a client device 702 and a user interface which displays an application document 704. A teaching user interface 706 is displayed in a targeted control comprised of a native control for the application and an asset comprised of messaging content describing that the application document 704 has successfully been saved to OneDrive® cloud-based storage, and images and associated messaging content describing additional functionality that can be utilized via OneDrive® services.

Figure 8:
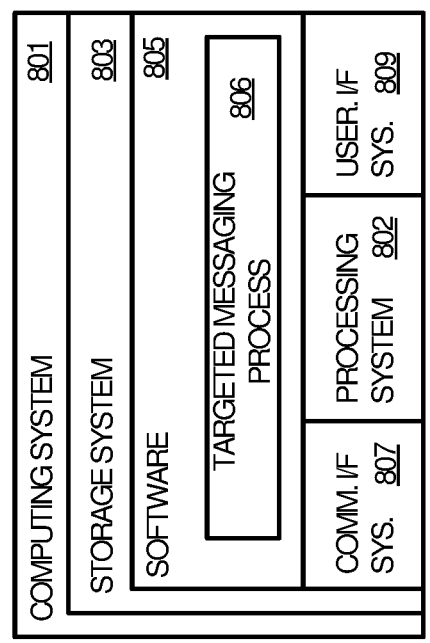
FIG. 8 illustrates a computing system suitable for implementing the targeted messaging technology disclosed herein, including any of the architectures, elements, processes, and operational scenarios and sequences illustrated in the Figures and discussed below in the Technical Disclosure.

FIG. 8 illustrates computing system 801, which is representative of any system or collection of systems in which the various applications, services, scenarios, and processes disclosed herein may be implemented. Examples of computing system 801 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. Software 805 includes targeted messaging process 806, which is representative of the processes discussed with respect to the preceding FIGS. 1-7. When executed by processing system 802, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device, but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device, but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtual machine software, or other application software, in addition to or that include targeted messaging process 806. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to provide targeted messaging capabilities. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 809 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method comprising:
   determining, based on a user interface type of a target device, a type of user-specific package to send to the target device;
   in a targeted messaging service, communicating a user-specific package of the determined type to a targeted messaging client of the target device in a native application that is:
      remote from the targeted messaging service,
      distinct from the user-specific package being communicated to the targeted messaging client, and
      installed prior to the user-specific package being communicated to the targeted messaging client, wherein the user-specific package specifies at least:
         which native control to invoke in response to a triggering event that is native to the native application, the triggering event comprising one of: a boot event of the native application; and a close event of the native application, and
         an asset to deploy in the native control, the asset comprising:
            content for a teaching user interface that describes instructions for a service associated with one of: the boot event of the native application, and the close event of the native application, and
            a link to additional content associated with the service;
   in the targeted messaging client, receiving the package from the targeted messaging service and monitoring for the event that triggers a targeted control comprising the teaching user interface;
   in response to detecting the event:
      forming the targeted control from at least the native control and the asset,
      displaying the targeted control in the native application,
      performing an action that is a default native application response to the event, the action comprising one of: an application boot operation; and a close application operation; and
   receiving, by the targeted messaging service, telemetry data related to a plurality of user interactions with the targeted control, and a plurality of different targeted controls corresponding to a plurality of different target devices, wherein the telemetry data comprises an indication of user engagement with the targeted control on the target device and the plurality of different targeted controls on the plurality of different target devices.

2. The method of claim 1, further comprising receiving, by the targeted messaging service, telemetry related to one or more user interactions associated with the target control, the telemetry comprising a user engagement metric.

3. The method of claim 1, wherein the indication of the user engagement with the targeted control comprises a determination of whether each of a plurality of users clicked on the targeted control when displayed.

4. The method of claim 1, further comprising:
   in the targeted messaging client, receiving user experience rules for a plurality of targeted controls for the native application, wherein at least one of the user experience rules is executable for monitoring for the occurrence of one or more prevention events that indicate that the targeted control should not be displayed upon detection of the event that triggers the targeted control.

5. The method of claim 1, wherein the user-specific package further specifies a secondary native control to invoke upon the triggering event occurring a second time, and a secondary asset to deploy in the secondary native control upon the triggering event occurring the second time.

6. The method of claim 5, further comprising:
   in the targeted messaging client, receiving an interaction with the targeted control;
   in the targeted messaging client, monitoring for the triggering event to occur a second time;
   in response to detecting a second occurrence of the triggering event, forming a secondary targeted control from at least the secondary native control and the secondary asset; and
   displaying the secondary targeted control in the user interface.

7. An apparatus comprising:
   one or more computer readable storage media;
   a processing system operatively coupled with the one or more computer readable storage media; and
   program instructions stored on the one or more computer readable storage media for providing a targeted messaging service that, when read and executed by the processing system, direct the processing system to at least:
   determine, based on a type of a target device, a type of user-specific package to send to the target device;
   communicate a user-specific package of the determined type to a targeted messaging client of the target device in a native application remote from the targeted messaging service, wherein the user-specific package specifies at least:
      which teaching user interface to invoke in response to a triggering event that is native to the native application, wherein the triggering event comprises one of: a boot event of the native application; and a close event of the native application, and an asset to deploy in the native control, wherein the native application is distinct from, and installed prior to, the user-specific package being communicated to the targeted messaging client, the asset comprising:
   content for a teaching user interface that describes instructions for a service associated with one of: the boot event of the native application, and the close event of the native application, and
   a link to additional content associated with the service;
receive an indication that the triggering event has occurred;
cause an action that is a default native application response to the triggering event to be performed;
cause the teaching user interface to be displayed; and
receive, by the targeted messaging service, telemetry data related to a plurality of user interactions with the teaching user interface, and a plurality of different teaching user interfaces corresponding to a plurality of different target devices, wherein the telemetry data comprises an indication of user engagement with the teaching user interface on the target device and the plurality of different teaching user interfaces on the plurality of different target devices.

8. The apparatus of claim 7, wherein the user-specific package further specifies user experience rules for a plurality of targeted controls for the native application.

9. The apparatus of claim 8, wherein at least one of the user experience rules is executable for monitoring for the occurrence of one or more prevention events that indicate that the teaching user interface should not be invoked upon detection of the triggering event.

10. The apparatus of claim 7, wherein the user-specific package further specifies a secondary teaching user interface in invoke upon the triggering event occurring a second time, and secondary asset to deploy in the secondary teaching user interface upon the triggering event occurring the second time.

11. An apparatus comprising:
one or more computer readable storage media;
a processing system operatively coupled with the one or more computer readable storage media; and
program instructions stored on the one or more computer readable storage media for providing a targeted messaging client that, when read and executed by the processing system, direct the processing system to at least:
   receive, by a targeted messaging client of a native application executed on a target device, a package from a targeted messaging service that specifies at least:
      which native control to invoke in response to a triggering event that is native to the native application, the triggering event comprising one of: a boot event of the native application; and a close event of the native application, and
      an asset to deploy in the native control, wherein the package is specific to the target device type, and wherein the native application is distinct from, and installed prior to, the package being received, and wherein the asset comprises:
         content for a teaching user interface that describes instructions for a service associated with one of: the boot event of the native application, and the close event of the native application, and
         a link to additional content associated with the service;
   monitor for the event that triggers a targeted control comprising the teaching user interface;
   in response to detecting the event, form the targeted control from at least the native control and the asset;
   display the targeted control in the native application;
   perform an action that is a default native application response to the event, comprising one of: an application boot operation; and a close application operation; and
   receive, by the targeted messaging service, telemetry data related to a plurality of user interactions with the targeted control, and a plurality of different targeted controls corresponding to a plurality of different target devices, wherein the telemetry data comprises an indication of user engagement with the targeted control on the target device and the plurality of different targeted controls on the plurality of different target devices.

12. The apparatus of claim 11, wherein the package further specifies a secondary native control to invoke upon the triggering event occurring a second time, and a secondary asset to deploy in the secondary native control upon the triggering event occurring the second time.

13. The apparatus of claim 12, wherein the program instructions, when read and executed by the processing system, further direct the processing system to:
receive an interaction with the targeted control;
monitor for the triggering event to occur the second time;
in response to detecting a second occurrence of the triggering event, forming a secondary targeted control from at least the secondary native control and the secondary asset; and
display the secondary targeted control in the user interface.

14. The apparatus of claim 11, wherein the package further specifies user experience rules for a plurality of targeted controls for the native application.

15. The apparatus of claim 14, wherein at least one of the user experience rules is executable for monitoring for the occurrence of one or more prevention events that indicate that the native control should not be invoked upon detection of the triggering event.

* * * * *